(12) United States Patent
Bonde et al.

(10) Patent No.: US 8,973,905 B2
(45) Date of Patent: Mar. 10, 2015

(54) VENTURI INSERT FOR A CARBURETOR, AND CARBURETOR, SYSTEM AND APPARATUS INCORPORATING THE SAME

(71) Applicant: Kohler Co., Kohler, WI (US)

(72) Inventors: Kevin G. Bonde, Kiel, WI (US); Christopher D. Thorn, Belgium, WI (US)

(73) Assignee: Kohler Co., Kohler, WI (US)

( * ) Notice: Subject to any disclaimer, the term of this patent is extended or adjusted under 35 U.S.C. 154(b) by 222 days.

(21) Appl. No.: 13/629,113

(22) Filed: Sep. 27, 2012

(65) Prior Publication Data

US 2014/0084494 A1  Mar. 27, 2014

(51) Int. Cl.
F02M 11/00 (2006.01)

(52) U.S. Cl.
USPC ..... 261/23.2; 261/34.1; 261/76; 261/DIG. 12

(58) Field of Classification Search
CPC ..... F02M 11/00; F02M 19/08; F02M 19/085; F02M 19/10
USPC ................... 261/34.1, 37, 40, 23.2, 76, 78.1, 261/DIG. 12, DIG. 45
See application file for complete search history.

(56) References Cited

U.S. PATENT DOCUMENTS

| | | |
|---|---|---|
| 3,823,702 A | 7/1974 | Roberts |
| 3,966,430 A | 6/1976 | Stephens |
| 4,130,099 A | 12/1978 | Ferguson |
| 4,274,386 A | 6/1981 | Reyes |
| 4,375,438 A | 3/1983 | McKay |
| 4,409,951 A | 10/1983 | Whitworthl |
| 4,757,792 A | 7/1988 | Flaig et al. |
| 4,864,705 A | 9/1989 | Guntly et al. |
| 4,966,735 A | 10/1990 | LoRusso |
| 5,034,163 A | 7/1991 | Baltz et al. |
| 5,049,318 A | 9/1991 | Guntly et al. |
| 5,287,828 A | 2/1994 | Kennedy |
| 5,601,059 A | 2/1997 | White et al. |
| 5,916,489 A | 6/1999 | Takeuchi |
| 6,595,175 B1 | 7/2003 | Capoferi et al. |
| 7,398,962 B2 | 7/2008 | Cooper |

FOREIGN PATENT DOCUMENTS

| | | |
|---|---|---|
| DE | 2638482 | 3/1977 |
| JP | 63036055 A * | 2/1988 |

* cited by examiner

Primary Examiner — Robert A Hopkins
(74) Attorney, Agent, or Firm — The Belles Group, P.C.

(57) ABSTRACT

A venturi insert for a carburetor, and a carburetor, system and apparatus incorporating the same. In one embodiment, the invention is a carburetor for an internal combustion engine comprising: a carburetor body comprising a plurality of throttle bores extending through the carburetor body, and for each of the throttle bores a fuel delivery passage terminating at a sidewall of the throttle bore; an insert comprising a plurality of venturi tubes and a linking member connecting the venturi tubes together, each of the venturi tubes comprising a venturi passage and a fuel port for introducing fuel into the venturi passage; and the insert secured to the carburetor body so that the venturi tubes extend into the throttle bores and the fuel ports are in fluid communication with the fuel delivery passages, and the linking member is in contact with the carburetor body.

20 Claims, 6 Drawing Sheets

VENTURI INSERT FOR A CARBURETOR, AND CARBURETOR, SYSTEM AND APPARATUS INCORPORATING THE SAME

FIELD OF THE INVENTION

The present invention relates generally to carburetors, and specifically to venturi inserts for insertion into multiple throttle bore carburetors.

BACKGROUND OF THE INVENTION in small utility engines, each throttle bore (also known as a barrel) of a multiple throttle bore carburetor generally provides air and fuel to only one cylinder. For example, a two-barrel carburetor would generally be used to fuel a two cylinder engine. Throttle bores are generally formed into a common component known as a carburetor body. Gaseous fuel carburetors (as opposed to the more common liquid fuel carburetors, such as gasoline) are used when an engine is designed to run on a fuel that is delivered to the ermine in gaseous form, such as natural gas or propane.

There are types of gaseous fuel carburetor designs that introduce fuel to the carburetor air stream via a venturi passage that is created when a "hollow" venturi tube is pressed or otherwise fitted into a throttle bore just upstream of the throttle plate/throttle shaft assembly. The venturi tube in this type of carburetor design is the component that meters fuel into the carburetor air stream by restricting the air flow slightly via a throat section, thereby creating a pressure differential that draws fuel from a fuel delivery passage of the carburetor body through a fuel port (which can consist of a plurality of metering orifices) formed in the wall of venturi tube.

Certain variations in engine design and construction (such as the 90 degree V-Twin configuration) have differing fuel requirements for each cylinder in order to run at optimum conditions in each cylinder. For multiple throttle bore carburetors, the prior art is such that each venturi tube is independent from the others, not only in function, but in construction as well. The venturi tubes can be made of a variety of materials and can have one or more metering orifices formed into the walls of the venturi tubes that can vary in size, circumferential and/or axial location relative to the venturi perimeter, and even shape.

Therefore, it becomes important for consistency of fuel delivery to the combustion chambers of the cylinders that these independent venturi tubes be fitted into the appropriate throttle bore, in the correct spatial orientation, and that they stay in the correct spatial orientation for the life, of the carburetor.

SUMMARY OF THE INVENTION

The present invention, in certain embodiments, is directed to an improved venturi insert for use with a multiple throttle bore carburetor that remedies one or more of the deficiencies described above. In other embodiments, the invention is directed to a carburetor, a system, and apparatus incorporating such an insert.

In one embodiment, the invention can be an insert for a carburetor body comprising: a first venturi rube comprising an outer surface and an inner surface forming a first venturi passage, the first venturi tube comprising a first fuel port extending from the outer surface of the first venturi tube to the inner surface of the first venturi tube; a second venturi tube comprising an outer surface and an inner surface forming, a second venturi passage, the second venturi tube comprising a second fuel, port extending from the outer surface of the second venturi tube to the inner surface of the second venturi tube; and a linking member having a first end connected to the first venturi tube and a second end connected to the second venturi tube, the linking member being flexible and resilient.

In another embodiment, the invention can be a carburetor for an internal combustion engine comprising: a carburetor body comprising a plurality of throttle bores extending through the carburetor body, and for each of the throttle bores a fuel delivery passage terminating at a sidewall of the throttle bore; an insert comprising a plurality of venturi tubes and a linking member connecting the venturi tubes together, each of the venturi tubes comprising a venturi passage and a fuel port for introducing fuel into the venturi passage; and the insert secured to the carburetor body so that the venturi tubes extend into the throttle bores and the fuel ports are in fluid communication with the fuel delivery passages, and the linking member is in contact with the carburetor body.

In yet, another embodiment, the invention can be a system for mixing air and a gaseous fuel for an internal combustion engine comprising: a carburetor comprising: a carburetor body comprising a plurality of throttle bores extending through the carburetor body, and for each of the throttle bores a fuel delivery passage terminating at a sidewall of the throttle bore; an insert comprising a plurality of venturi tubes and a linking member connecting the venturi tubes together, each of the venturi tubes comprising a venturi passage and a fuel port for introducing fuel into the venturi passage; and the insert secured to the carburetor body so that the venturi tubes extend into the throttle bores and the fuel ports are in fluid communication with the fuel delivery passages, and the linking member is in contact with the carburetor body; and a source of gaseous fuel fluidly coupled to the fuel delivery passages of the carburetor.

In still another embodiment, the invention can be an apparatus comprising: a frame; an internal combustion engine mounted to the frame; a source of gaseous fuel; and a carburetor for creating a mixture of air and the gaseous fuel, the carburetor comprising a carburetor body comprising a plurality of throttle bores extending through the carburetor body, and for each of the throttle bores a fuel delivery passage terminating at a sidewall of the throttle bore; an insert comprising a plurality of venturi tubes and a linking member connecting the venturi tubes together, each of the venturi tubes comprising a venturi passage and a fuel port for introducing fuel into the venturi passage; and the insert secured to the carburetor body so that the venturi tubes extend into the throttle bores and the fuel ports are in fluid communication with the fuel delivery passages, and the linking member is in contact with the carburetor body. In various embodiments, the apparatus can be, for example, a lawnmower, a trimmer, a chainsaw, a snowblower, brush chippers, a generator, a pump (such as a water pump, crude-oil pump, and gas pump), an off-road utility vehicle, power tools (such as concrete power trowels and floor buffers).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
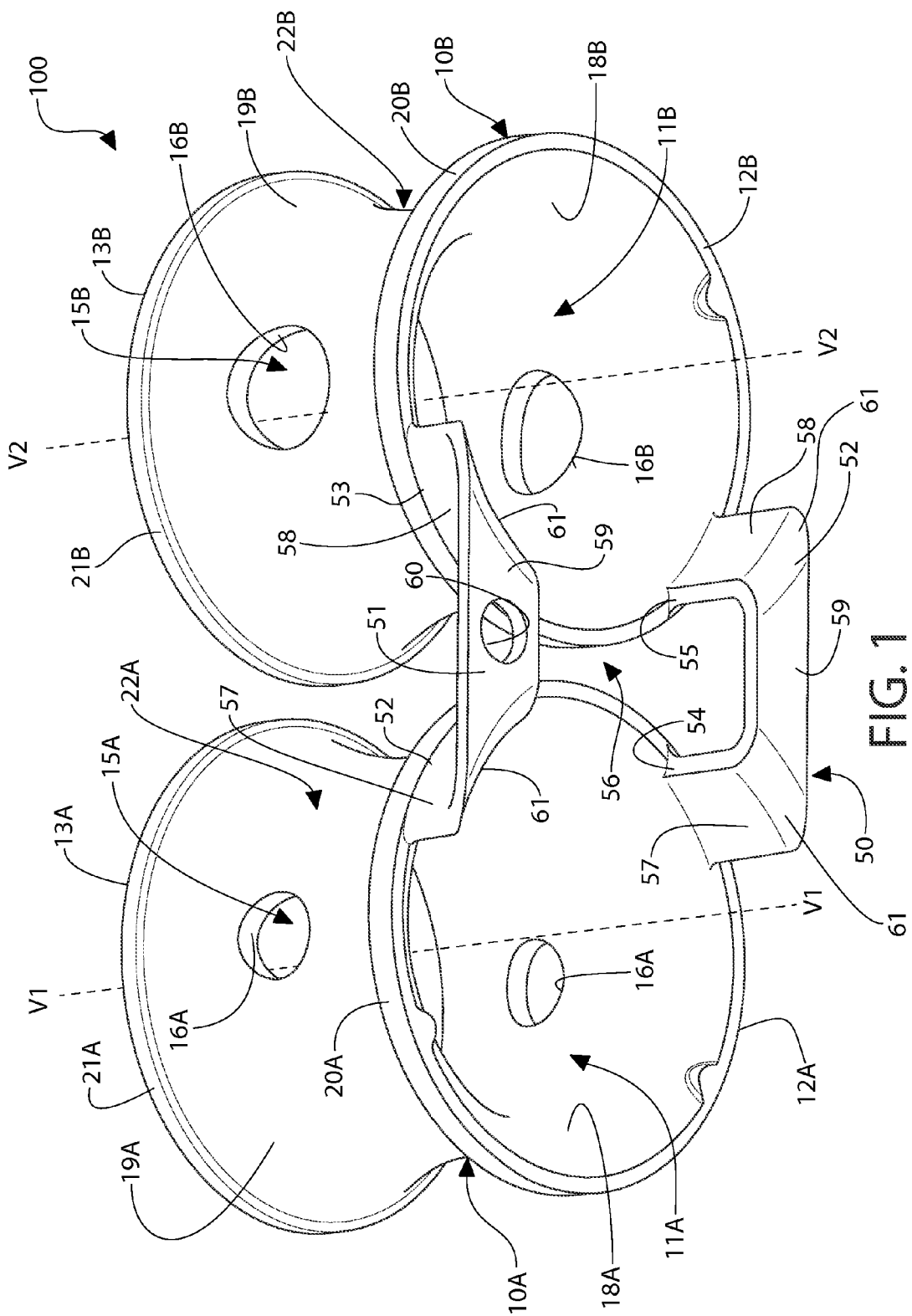
FIG. 1 is a perspective view of a venturi insert according to an embodiment of the present invention.

The following description of embodiment(s) of the invention is merely exemplary in nature and is in no way intended to limit the invention, its application, or uses. The description of illustrative embodiments according, to principles of the present invention is intended to be read in connection with the accompanying drawings, which are to be considered part of the entire written description. In the description of the exemplary embodiments of the invention disclosed herein, an reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and similar refer to a relationship wherein structures are secured or attached to one another either directly or indirectly through intervening structures, as well as both movable or rigid attachments or relationships, unless expressly described otherwise. Moreover, the features and benefits of the invention are described by reference to the exemplary embodiments illustrated herein. Accordingly, the invention expressly should not be limited to such exemplary embodiments, even if indicated as being preferred. The discussion herein describes and illustrates some possible non-limiting combinations of features that may exist alone or in other combinations of features. The scope of the invention is defined by the claims appended hereto.

Referring first to FIG. 1, a venturi insert 100 is illustrated according to one embodiment of the present invention. The exemplified venturi insert 100 is designed for use in conjunction with a carburetor having two throttle bores (commonly referred to as dual-barrel carburetor). Thus, the venturi insert 100 comprises two venturi tubes, namely a first venturi tube 10A and a second venturi tube 10B. The invention, however, is not limited to the venturi insert 100 having two venturi tubes 10A-B. In other embodiments, the venturi insert 100 can comprise more than two venturi tubes, such as three, four, or six venturi tubes. The exact number of venturi tubes included in the venturi insert, in certain circumstances, will be dictated by the number of throttle bores of the carburetor into which the venturi insert is to be incorporated.

The venturi insert 100 generally comprises a first venturi tube 10A, a second venturi tube 10B, and a linking member 50 extending between and connecting the first and second venturi tubes 10A-B. In the exemplified embodiment, the connecting member 50 comprises a first strap 51 and a second strap 52. The invention, however, is not so limited. In other embodiments, the linking member 50 may comprise a single snap or may be a plate-like member or a rod-like member. As will be discussed in greater detail below, the connecting member 50, in some embodiments, is flexible and resilient so that the relative orientation between the first and second venturi tubes 10A-B can be altered by flexing the linking member 50, thereby allowing for ease of mounting the venturi insert 100 to the carburetor body 200.

The first venturi tube 10A comprises an inner surface 18A that forms a first venturi passage 11A that extends along a first venturi axis V1-V1 from an inlet edge 12A to an outlet edge 13A. Similarly; the second venturi tube 10B comprises an inner surface 18A that forms a second venturi passage 11B that extends along a second venturi axis V2-V2 from an inlet edge 12B to an outlet edge 13B. Thus, the first and second venturi passages 11A-B extend through the entirety of the venturi tubes 10A-B respectively, thereby forming through-passages in which incoming air can be mixed with fuel and outputted as a desired air-fuel mixture. The first and second venturi tubes 10A-B are hollow tubes.

In a normal state (i.e., a state in which the venturi insert is under no external force), the linking member 50 maintains the first and second venturi tubes 10A-B in an orientation in which the first and second venturi axes V1-V1, V2-V2 are substantially parallel to one another (as shown in FIG. 1). However, when subjected to external forces (such as during installation to the carburetor body 200); the linking member 50 will flex so as to allow the orientation between the first and second venturi tubes 10A-B to be altered, thereby achieving a flexed state (not shown). In the flexed state, the first and second venturi tubes 10A-B are arranged so that: (1) the first and second venturi axes V1-V1, V2-V2 are not substantially parallel to one another; and/or the orthogonal distance between the first and second venturi axes V1-V1, V2-V2 is changed as compared to the normal state. However, due to the resilient nature of the linking member 50, the linking member 50 will bias the first and second venturi tubes 10A-B from the flexed state hack into the normal state upon cessation of the external force (assuming that no prohibitive structure is present). As discussed in greater detail below, the flexible and resilient nature of the linking member 50 is due, at least in part, to the material of which the linking member 50 is constructed. The shape and cross-section of the linking member 50 will also contribute to its flexibility.

In another embodiment, after formation of the venturi 100, when in the normal state (i.e., a state in which the venturi insert 100 is under no external force), the linking member 50 maintains the first and second venturi tubes 10A-B in an orientation in which the first and second venturi axes V1-V1, V2-V2 are non-parallel parallel to one another (not shown). However, when subjected to external forces (such as during installation to the carburetor body 200), the linking member 50 will flex so as to allow the orientation between the first and second venturi tubes 10A-B to be altered so that the first and second venturi axes V1-V1, V2-V2 are parallel to one another, thereby achieving, the flexed state (not shown).

In the exemplified embodiment, the venturi insert 100 is an integrally formed single component. In other words, the first and second venturi tubes 10A-B and the connecting member 50 are formed as a single unitary structure, as opposed to a compilation of components that are separately formed and later assembled and/or otherwise coupled together. In such a single-component embodiment, the venturi insert 100 can be formed, for example, by techniques such as molding (including injection molding), casting, milling, and/or combinations thereof it should be noted that the invention, however, is not so limited in all embodiments. For example, in certain alternate embodiments, the venturi insert 100 can be a multi-component structure.

In one embodiment, the entirety of the venturi insert 100, including each of the first and second venturi tubes 10A-B and the linking member 50, is formed of a material having a Young's modulus that is less than the Young's modulus of the material of which the carburetor body 200 is formed. In certain embodiments, the entirety of the venturi insert 100, including each of the first and second venturi tubes 10A-B and the linking member 50, is formed of a material having a Young's modulus in a range of 1.5 GPa to 50 GPa (in one or both of tension and flexure), and more preferably in a range of 10 GPa to 30 GPa (in one or both of tension and flexure). In one specific embodiment, the venturi insert 100 is formed of a material having a Young's modulus of about 17 GPa in tensions (as defined by ASTM D638) and 14 GPa in flexure (as defined by ASTM D790). One suitable material for the construction of the entirety of the venturi insert 100, including each of the first and second venturi tubes 10A-B and the linking member 50, is a thermoplastic (polymers or synthetic resins). Suitable thermoplastics include, without limitation, a polyphthalamide (PPA), a polyamide (PA or nylon), a polyphenylene sulfide (PPS), a polyethylene terephthalate (PET or polyester), or combinations thereof. Of course, other materials are used to construct the venturi insert 100, or portions thereof, in other embodiments of the invention. Unless specifically claimed, the materials and methodologies of construction of the venturi insert 100 are not to be construed as limiting of the present invention.

The design of the linking member 50, including both its shape and cross-section, is such that the linking member 50 is more flexible than the first and second venturi tubes 10A-B. Naturally, there is a manufacturing tolerance in the resulting space/distance between the first and second venturi tubes 10A-B when they are formed as part of the single component venturi insert 100. Moreover, there is also a natural manufacturing tolerance in the resulting space/distance between the throttle bores 210A-B of the carburetor body 200 to which the venturi insert 100 is to be mounted. As will become more apparent from the discussion below, the flexibility of the linking member 50 allows the venturi insert 100 to flex so that the first and second venturi tubes 10A-B can be more easily aligned with the individual throttle bores 210A-B of the carburetor body 200 during installation of the venturi insert 100 to the carburetor body 200.

Referring still to FIG. 1, the first venturi tube 10A comprises a first fuel port 15A for introducing fuel into the first venturi passage 11A while the second venturi tube 10B comprises a second fuel port 15B for introducing fuel into the second venturi passage 11B. In the illustrated embodiment, the first fuel port 15A comprises a plurality of apertures 16A arranged in a circumferentially equi-spaced manner about the first venturi axis V1-V1 of the first venturi tube 10A. Similarly, the second fuel port 15B, in the exemplified embodiment, comprises a plurality of apertures 16B arranged in a circumferentially equi-spaced manner about the second venturi axis V2-V2 of the second venturi tube 10B. While each of the first and second fuel ports 15A-B comprise two apertures 16A-B respectively, either or both of the first and second fuel ports 15A-B can comprise more or less apertures 16A-B as needed to achieve the desired delivery of fuel into the air stream.

The first fuel port 15A (which comprises apertures 16A in the exemplified embodiment) extends from the outer surface 19A to the inner surface 18A of the first venturi tube 10A, thereby forming a radial passageway (relative to the first venturi axis V1-V1) through the body of the first venturi tube 10A. As a result, fuel supplied to the exterior of the first venturi tube 10A can be drawn into the first venturi passage 11A in a metered manner. Similarly, the second fuel port 15B (which comprises apertures 16B in the exemplified embodiment) extends from the outer surface 19B to the inner surface 18B of the second venturi tube 10B, thereby forming a radial passageway (relative to the second venturi axis V2-V2) through the body of the second venturi rube 10B. As a result, fuel supplied to the exterior of the second venturi tube 10B can be drawn into the second venturi passage 11B in a metered manner.

In the exemplified embodiment, the first and second fuel ports 15A-B are designed to introduce fuel into the corresponding air streams at different rates based on the different requirements of the cylinder that is fed by the throttle bore 210A-B in which the venturi tube 10A-B is located. Thus, the venturi insert 100 cart be incorporated into a carburetor body 200 so as to create air-fuel mixtures with different characteristics in each of the first and second throttle bores 210A-B, despite the first and second throttle bores 210A-B having otherwise identical structure and geometry. In the venturi insert 100, this is achieved by the first fuel port 15A having an effective cross-sectional area (which is the summation of the cross-sectional areas of the apertures 16A) that is different than the effective cross-sectional area of the second fuel port 15B (which is the summation of the cross-sectional areas of the apertures 16B). As can be seen from FIG. 1, this difference between the effective cross-sectional area of the first and second fuel ports 15A-B is achieved by designing the apertures 16B of the second fuel port 15B to be larger than the apertures 16A of the first fuel port 15A. Of course, in other embodiments, a desired difference between the effective cross-sectional area of the first and second fuel ports 15A-B can be accomplished by having a different number of the same sized apertures and/or changing the shape of the apertures. In still other embodiments, the first and second fuel ports 15A-B can be designed to introduce fuel into the corresponding air streams at different rates by incorporating metering restrictions, bends, flow controllers and other mechanisms known in the art.

The first venturi tube 10A also comprises a first annular flange 20A at a proximal end thereof and a second annular flange 21A at a distal end thereof. The first annular flange 20A forms the inlet edge 12A of the first venturi tube 10A while the second annular flange 21A forms the outlet edge 13A of the first venturi tube 10A. Similarly, the second venturi tube 10B comprises a first annular flange 20B at a proximal end thereof and a second annular flange 21B at a distal end thereof. The first annular flange 20B forms the inlet edge 12B of the second venturi tube 10B while the second annular flange 21B forms the outlet edge 13B of the second venturi tube 10B.

The first venturi tube 10A also comprises a first annular groove 22A formed in the outer surface 19A thereof between the first and second annular flanges 20A, 21A of the first venturi tube 10A. The first fuel port 15A (which in the exemplified embodiment comprises apertures 16A) is located at the floor of the first annular groove 22A of the first venturi tube 10A. Thus, the first fuel port 15A extends from the first annular groove 22A to the first venturi passage 11A, thereby forming a passageway through which fuel in the first annular groove 22A can be introduced into an air stream flowing through the first venturi passage 11A. Similarly, the second venturi tube 10B also comprises a first annular groove 22B formed in the outer surface 19B thereof between the first and second annular flanges 20B, 21B of the second venturi tube 10B. The second fuel port 15B (which in the exemplified embodiment comprises apertures 16B) is located, at the floor of the second annular groove 22B of the second venturi tube 10B. Thus, the second fuel port 15B extends from the second annular groove 22B to the second venturi passage 11B, thereby forming a passageway through which fuel in the first and second annular grooves 22A-B can be introduced into an air stream flowing through the second venturi passage 11B. In certain other embodiments, the annular grooves may be partially or entirely omitted.

As will be discussed in greater detail below, when the venturi insert 100 is mounted to the carburetor body 200, the first and second flanges 20A-B, 21A-B of the first and second venturi tubes 10A-B act as integrally-formed gaskets that form hermetic seals 212A-D) with the sidewalk 211A-B of the throttle bores 210A-B, thereby ensuring that all incoming air only passes through the first and second venturi passages 11A-B. These hermetic seals 212A-D also ensure that all fuel delivered to the first and second annular grooves 22A-B is only introduced into the air stream via the first and second fuel ports 15A-B.

Figure 6:
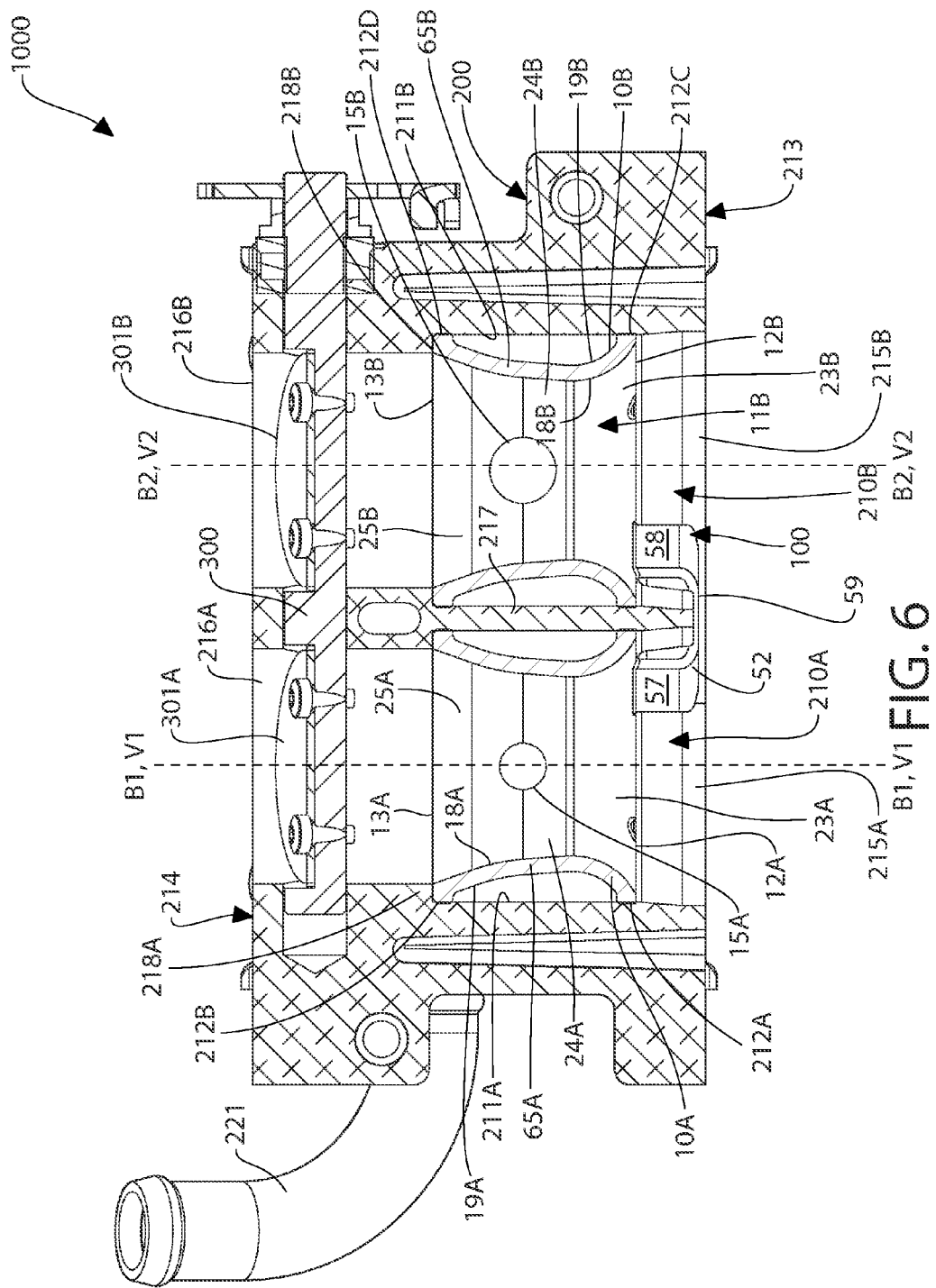
FIG. 6 is an axial cross-sectional view of the carburetor of FIG. 2 taken along view VI-VI of FIG. 5.

Referring now to FIGS. 1 and 6 concurrently, each of the first and second venturi passages 11A-B comprises an inlet section 23A-B, a throat section 24A-B, and an outlet section 25A-B respectively. For each of the of the first and second venturi passages 11A-B, the throat section 24A-B is located between the inlet section 23A-B and the outlet sections 25A-B respectively. Each of the inlet sections 24A-B has a transverse cross-sectional area (measured transverse to the first and second venturi axes V1-V1, V2-V2 respectively) that decreases in size moving from the inlet edges 12A-B toward the throat sections 24A-B. To the contrary, each of the outlet sections 25A-B has a transverse cross-sectional area (measured transverse to the first and second venturi axes V1-V1, V2-V2 respectively) that increases in size moving from the throat sections 24A-B toward the outlet edges 13A-B. As can be seen in FIG. 6, for each of the first and second venturi tubes 10A-B, the transverse cross-sectional area of the inlet sections 23A-B decrease at an average rate (per axial distance) that is greater than the average rate (per axial distance) at which the transverse cross-sectional area of the outlet sections 25A-B increase. Moreover, for each of the first and second venturi tubes 10A-B, the transverse cross-sectional area of the first and second venturi passages 11A-B at the inlet edges 12A-B is greater than the transverse cross-sectional area of the first and second venturi passages 11A-B at the outlet edges 13A-B. Thought of another way, for each of the first and second venturi tubes 10A-B, the first and second venturi passages 11A-B have a diameter at the inlet edges 12A-B that is greater than the diameter at the outlet edges 13A-B.

The throat sections 24A-B have the smallest transverse cross-sectional area (as compared to the inlet and outlet sections) and, thus, form the flow constrictions in the first and second venturi passages 11A-B that create the desired venturi effect when air stream flows through the first and second venturi passages 11A-B. Specifically, due to the constrictions created by the throat sections 24A-B, a zone of low pressure (and high velocity) is created in the air streams at (and adjacent to) the throat sections 24A-B. Thus, by properly locating the first and second fuel ports 15A-B within the low pressure zones, fuel will be drawn into and mixed in the air streams through the first and second fuel ports 15A-B. In the exemplified embodiment, the first fuel port 15A of the first venturi tube 10A is located in the outlet section 25A of the first venturi passage 11A adjacent the throat section 23A of the first venturi passage 11A. Similarly, the second fuel port 15B of the second venturi tube 10B is located in the outlet section 25B of the second venturi passage 11B adjacent the throat section 24B of the second venturi passage 11B. Of course, the exact location of the first and second fuel ports 15A-B can be varied within the low pressure zones created by the throat sections 24A-B.

Referring again solely to FIG. 1, additional details of the linking member 50 will be described. As mentioned above, the exemplified embodiment of the linking member 50 comprises a first strap 50 and a second strap 51. The invention, however, is not so limited. For example, in other embodiments, the linking member 50 may comprise a single strap or may be a plate-like member or a rod-like member.

The first strap 50 has a first end 52 connected to the inlet edge 12A of the first venturi tube 10A and a second end 53 connected to the inlet edge 12B of the second venturi tube 10B. Similarly, the second strap 51 has a first end 54 connected to the inlet edge 12A of the first venturi tube 10A and a second end 55 connected to the inlet edge 12B of the second venturi tube 10B. The first and second straps 51, 52 are separated from one another by a gap 56.

In the illustrated embodiment, each of the straps 51, 52 is an elongated structure comprising a first axial section 57, a second axial section 58, and a transverse section 59. The transverse section 59 extends between and connects the first and second axial sections 57, 58 together. For each of the straps 51, 52, the first axial section 57 is connected to the inlet edge 12A of the first venturi tube 10A while the second axial section 58 is connected to the inlet edge 12B of the second venturi tube 10B. In the exemplified embodiment, each of the first and second axial sections 57, 58 has an arcuate transverse cross-section having a radius of curvature that is substantially equal to the radius of curvature of the inlet edges 12A-B of the first and second venturi tubes 10A-B. The invention, however, is not so limited in all embodiments and the first and second axial sections 57, 58 may be flat or dissimilarly contoured. Additionally, for each of the first and second straps 51, 52, the first and second axial sections 57, 58 extend substantially perpendicular to the transverse sections 59 and are joined thereto with rounded corners 61. However, in other embodiments, the first and second axial sections 57, 58 extend oblique to the transverse sections 59.

In one embodiment, the first and second axial sections 57, 58 of the second strap 52 have a length that is greater than the length of the first and second axial sections 57, 58 of the first strap 51. In the exemplified embodiment, the first and second inlet edges 12A of the first and second venturi tubes 10A-B are transversely aligned. As a result, the second strap 52 protrudes further from the inlet edges 12A of the first and second venturi tubes 10A-B in the axial direction. This allows the first strap 51 to contact a portion of the end surface 13 of the carburetor body 200 that is non-coplanar to the portion of the end surface 13 of the carburetor body 200 that is contacted by the second strap 52 when the venturi insert 100 is mounted to the carburetor body 200.

Each of the first and second straps 51, 52 takes on a generally U-shape or a generally C-shape, wherein the end points of the U or C are connected to the inlet edges 12A of the first and second venturi tubes 10A-B. As discussed in greater detail below, shaping first and second straps 51, 52 as such allows the first and second straps 51, 52 to abut against an end surface 213 of a divider 217 of the carburetor body 200 while at the same time extend into each of the first and second throttle bores 210A-B so that the first and second venturi tube 10A-B can located deep inside thereof and spaced from the throttle bore inlets 215A-B.

The transverse cross sections of the straps 51, 52, in certain embodiments, will vary depending upon the relative size of the venturi tubes 10A-B themselves, or upon the amount of total manufacturing variation that the design would need to accommodate. In one specific embodiment, the venturi size (it's minimum internal diameter) is between 23.15 mm, and the total manufacturing variation is 0.3 mm for the venturi insert and 0.15 mm for the carburetor body. The transverse cross section areas for the straps 51, 52 are 5.7 $mm^2$ for the first strap 51 and 8.2 $mm^2$ for the second strap 52 (the transverse cross section through the second strap mounting hole is approximately 3 $mm^2$). If a 10 mm venturi insert were to be designed, it would generally have a smaller transverse cross sectional areas, whereas if a 40 mm venturi insert were designed, the transverse cross sectional area would be generally larger. If either were to be designed to accommodate more manufacturing variation, the transverse cross sectional areas would be generally smaller, and so on.

Figure 5:
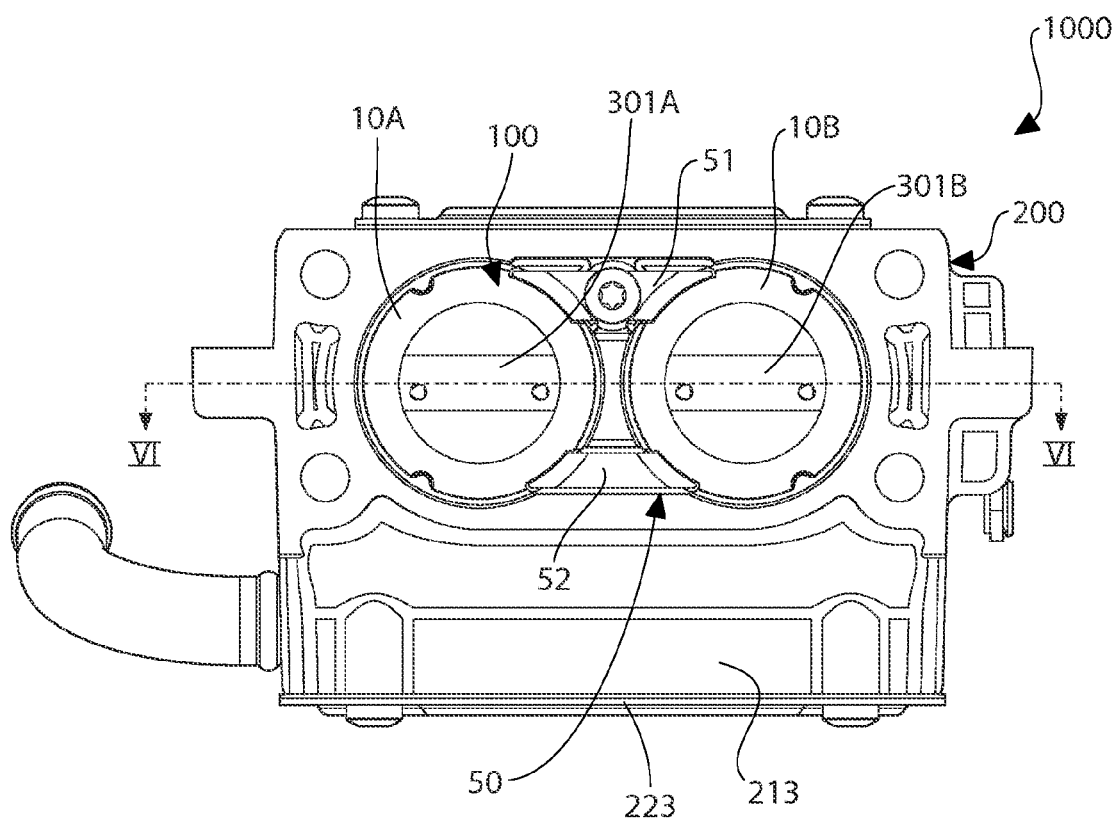
FIG. 5 is a front view of the carburetor of FIG. 2.

As can be seen, the first and second straps 51, 52 extend from only one side of the inlet edge 12A-B for each of the first and second venturi tubes 10A-B. Thought of another way, if each of the inlet edges 12A-B is conceptualized as having a circumference that is formed of a first semi-circular portion extending from the 12:00 position to the 6:00 and a second semi-circular portion extending from the 6:00 position to the 12:00 position, the first and second straps 51, 52 only extend from the first semi-circular portion of the first venturi tube 10A and from the second semi-circular portion of the second venturi tube 10B. Moreover, as can be seen in FIG. 5, no portion of the first strap 51 extends above an uppermost portion of the inlet edges 12A of the first and second venturi tubes 10A-B while no portion of the second strap 52 extends below a lowermost portion of the inlet edges 12A of the first and second venturi tubes 10A-B.

When the venturi insert 100 is mounted to the carburetor body 200, the first axial sections 57 of the first and second straps 51, 52 extend into the first throttle borer 210A while the second axial sections of the first and second straps 51, 52 extend into the second throttle bore 210B. The transverse sections 59 contact the carburetor body 200 as described further below.

Figure 2:
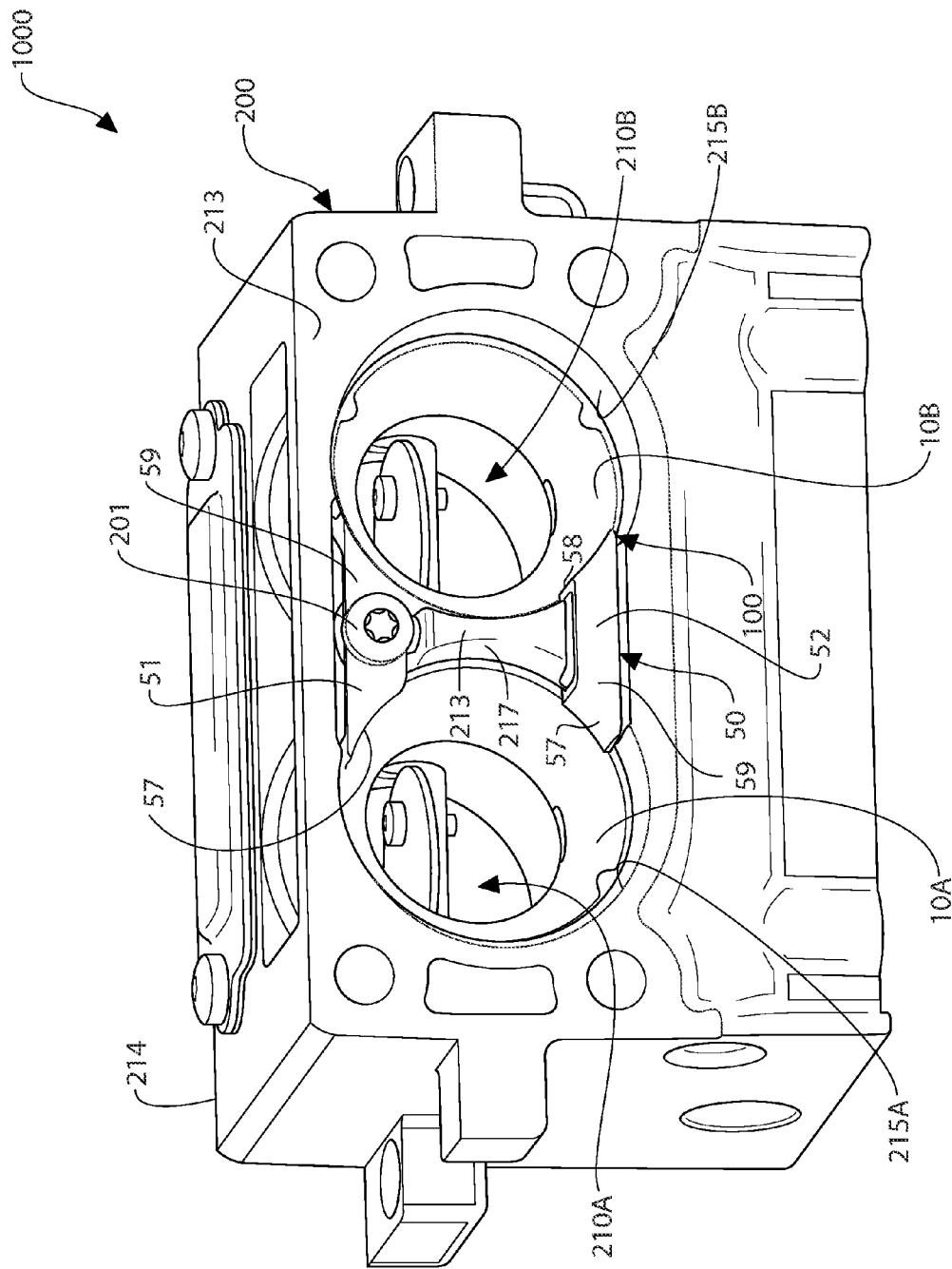
FIG. 2 is a perspective view of a carburetor incorporating the venturi insert of FIG. 1 according to an embodiment of the present invention.

Furthermore, the first strap 51 comprises a means for securing the venturi insert 100 to the carburetor body 200. In the exemplified embodiment, the securing means is in the form of a hole 60 through which a bolt 201 (FIG. 2) or other fastener extends to threadily engage a threaded hole in the carburetor body 200. In other embodiments, the securing means can be one or more tangs that engage one or more lips or edges of the carburetor body via a slide-fit, snap-fit, friction-fit, interference-fit, or tight-fit engagement. In yet other embodiments, the securing means can be a protuberance, flange, ridge, groove, or other feature that mates/engages a corresponding protuberance, flange, hole, ridge, groove, or other feature of the carburetor body via a slide-fit, snap-fit, friction-fit, interference-fit, or tight-fit engagement. In still other embodiments, the securing means can be a bayonet, a clamp, an adhesive, a weldable feature, etc.

As can be seen from FIG. 1, the second strap 52 is free of a securing means (i.e., a hole 60 in the exemplified embodiment). Omitting the securing means from the second strap 52 results in the linking, member 50 being non-symmetric about a plane that comprises both the first and second venturi axes V1-V1, V2-V2. Such an arrangement prevents the venturi insert 100 from being mounted to the carburetor bed 200 in an upside-down configuration. In certain embodiments where the linking member 50 is formed by a structure(s) other than first and second straps 51, 52, the linking, member 50 is either shaped or has a feature that renders the linking member non-symmetric about a plane that comprises both the first and second venturi axes V1-V1, V2-V2 to prevent improper installation of the venturi insert 100 to the carburetor body 200.

It should be noted that while the linking member 50 is described above in detail in the form of the first and second straps 51, 52, the concepts and structural relationships described above are applicable to other structural embodiments of the linking member 50.

Referring again to FIGS. 1 and 6 concurrently, the venturi tubes 10A-B have the same overall dimensions (such outside diameter, length, inside diameter, inlet radius, outlet radius, wall thickness, etc). Thus, with the exception of the fuel ports 15A-B, which are designed to appropriately meter fuel for their respective throttle bore 210A-B, the venturi tubes 10A-B are identical. Thus, the venturi tubes 10A-B are similarly constructed but functionally independent venturis.

Each of the first and second venturi tubes 10A-B are respectively formed by a tubular wall 65A-B. Each of the tubular walls 65A-B respectively extend from the first flange 20A-B to the second flange 21A-B and have a substantially constant thickness (wherein thickness is measured respectively from the inner surface 18A-B to the outer surface 19A-B). In the exemplified embodiment, each of the tubular walls 65A-B have a generally hour-glass shaped axial cross-section profile (see FIG. 6). However, the first and second venturi tubes 10A-B can be designed so that the axial cross-section profiles take on different shapes in alternate embodiments. In further embodiments, the thickness of the tubular walls 65A-B may not be substantially constant.

Referring now to FIGS. 2-6 concurrently, a carburetor 1000 according to one embodiment of the present invention is illustrated. The carburetor 1000 generally comprises a carburetor body 200 to which the venturi insert 100 has been mounted and secured. In one embodiment, the carburetor body 200 is formed of a material having a Young's modulus that is greater than the Young's modulus of the material which the venturi insert 100 is constructed. In certain embodiments, the carburetor body 200 is formed of a metallic material having a Young's modulus in at range of 45 GPa to 235 GPa, and more preferably in a range of 60 GPA to 80 GPa, and most preferably about 70 GPA. In one specific embodiment, the carburetor body 200 is formed aluminum diecast 380 which has a Young's modulus of 71 GPa. Suitable metals or metal alloys for construction of the body include, without limitation, include aluminum, magnesium, zinc, zinc-aluminum, or even carbon steel.

Of course, other non-metallic materials are used to construct the carburetor body 200 in other embodiments of the invention, such as glass or carbon fiber reinforced thermoplastics, in some of such embodiments, the Young's modulus of the carburetor body 200 may not be less than the Young's modulus of the venturi insert 100. However, because of the bulk nature of the carburetor body 200 (thickness of walls, etc.), the carburetor body 200 will still be overall less flexible and overall more rigid than the venturi insert 100. In a specific one of such embodiments, the carburetor body 200 could be constructed from the same material as the venturi insert 100.

Unless specifically claimed, the materials and methodologies of construction of the carburetor body 200 are not to be construed as limiting of the present invention.

The carburetor body 200 comprises a first throttle bore 210A and a second throttle bore 210B extending there-through. Each of the first and second throttle bores 210A-B extend from a first end surface 213 of the carburetor body 200 to a second end surface 214 of the carburetor body 200, wherein the second end surface 214 is opposite the first end surface 213. In one embodiment of the invention where the carburetor 1000 is incorporated into an internal combustion engine, an air-intake manifold is coupled to the first end surface 213 of the carburetor body 200 so that an incoming air stream is introduced into each of the first and second throttle bores 210A-B via the first and second throttle bore inlets 215A-B of the first and second venturi tubes 210A-B respectively. As these air streams pass through the first and second throttle bores 210A-B, fuel is introduced and mixed into these air streams via the first and second fuel ports 215A-B respectively, thereby creating the desired air-fuel mixtures. The air-fuel mixtures exit the first and second throttle bores 210A-B via the first and second throttle bore outlets 216A-B respectively. These exiting air-fuel mixture streams are then fed into the cylinders of the internal combustion engine for combustion therein as is known in the art.

The first throttle bore 210A extends along a first throttle bore axis B1-B1 while the second throttle bore 210B extends along a second throttle bore axis B2-B2. In the exemplified embodiment, the first and second throttle bore axes B1-B1, B2-B2 are substantially parallel to one another. In alternate embodiments, however, the first and second throttle bore axes B1-B1, B2-B2 may not be parallel to one another. The carburetor body 200 flintier comprises a divider 217 that separates the first throttle bore 210A and the second throttle bore 210B from one another.

When the venturi insert 100 is mounted to the carburetor body 200, the first venturi tube 10A is fully inserted and located within the first throttle bore 210A. The first venturi tube 10A is located within the first throttle bore 210A so that the inlet edge 12A of the first venturi tube 10A is spaced from the first throttle bore inlet 215A. Moreover, in the exemplified embodiment, the first venturi tube 10A is oriented within the first throttle bore 210A so that the first venturi axis V1-V1 is substantially co-axial with the first throttle bore axis B1-B1 (see FIG. 6). Similarly, the second venturi tube 10B is fully inserted and located within the second throttle bore 210B. The second venturi tube 10B is located within the second throttle bore 210B so that the inlet edge 12B of the second venturi tube 10B is spaced from the second throttle bore inlet 215B. In the exemplified embodiment, the second venturi tube 10B is oriented, within the second throttle bore 210B so that the second venturi axis V2-V2 is substantially co-axial with the second throttle bore axis B2-B2 (see FIG. 6). Furthermore, when the venturi insert 100 is mounted to the carburetor body 200, the linking, member 50 contacts the end surface 213. In the exemplified embodiment, the linking member 50 (which comprises the first and second straps 51, 52) contacts a portion of the end surface 213 that is located on the divider 217. Preferably, the venturi insert 100 is mounted to the carburetor body 200 as described above using a press fit technique. Thus, in certain embodiments, both the first and second throttle bores 210A-B and the first and second venturi tubes 10A-B have a circular transverse cross-sectional profile.

In the exemplified embodiment, each of the first and second straps 51, 52 are in contact with the end surface 13 of the carburetor body 200, and specifically the divider 217. More specifically, for each of the first and second straps 51, 52: (1) the first axial sections 57 extend into the first throttle bore 210A: (2) the transverse sections 59 contact the end surface 13 on the divider 217; and (3) the second axial section 58 extend into the second throttle bore 210B. Thus, each of the first and second straps 51, 52 partially wrap around the divider 217.

As can be seen in FIG. 6, the sidewall 211A of the first throttle bore 210A comprises a first annular shoulder 218A while the sidewall 211B of the second throttle bore 210A comprises a second annular shoulder 218B. In the exemplified embodiment, each of the first and second annular shoulders 218A-B extends transversely from the sidewalls 211A-B respectively. When mounted to the carburetor body 200, the outlet edges 13A-B of the first and second venturi tubes 10A-B are in abutment against the first and second annular shoulders 218A-B respectively. Thus, the first and second annular shoulders 218A-B provide structures that prevent over insertion of the first and second venturi tubes 10A-B in the first and second throttle bores 210A-B respectively, thereby further ensuring proper relative positioning. However, in certain embodiments, proper axial positioning (and retention) of the first and second venturi tubes 10A-B in the first and second throttle bores 210A-B can be achieved solely by the interaction between the linking member 50 and the end surface 213 of the carburetor body 200.

Figure 3:
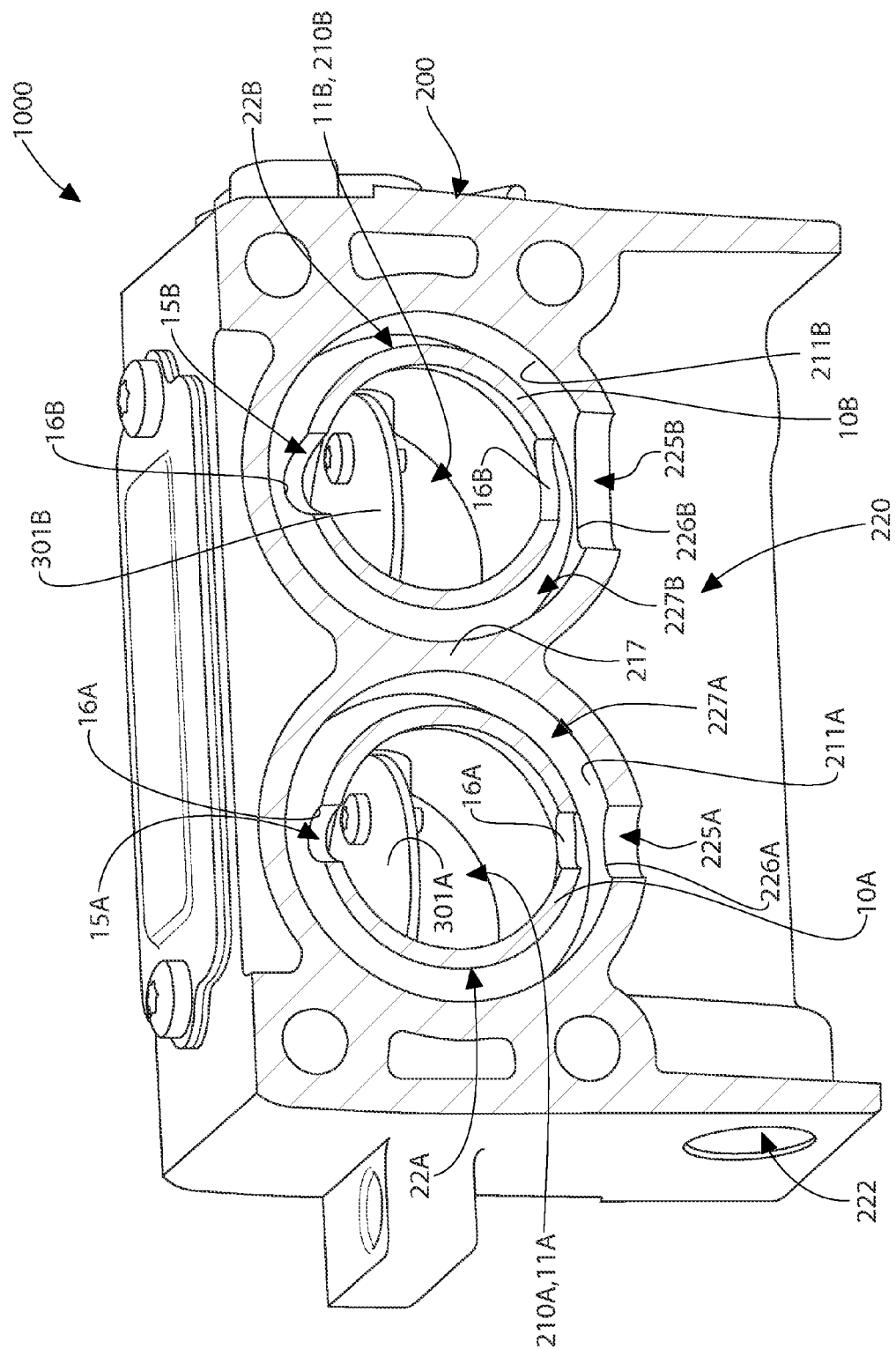
FIG. 3 is a transverse cross-sectional view of the carburetor of FIG. 2.
Figure 4:
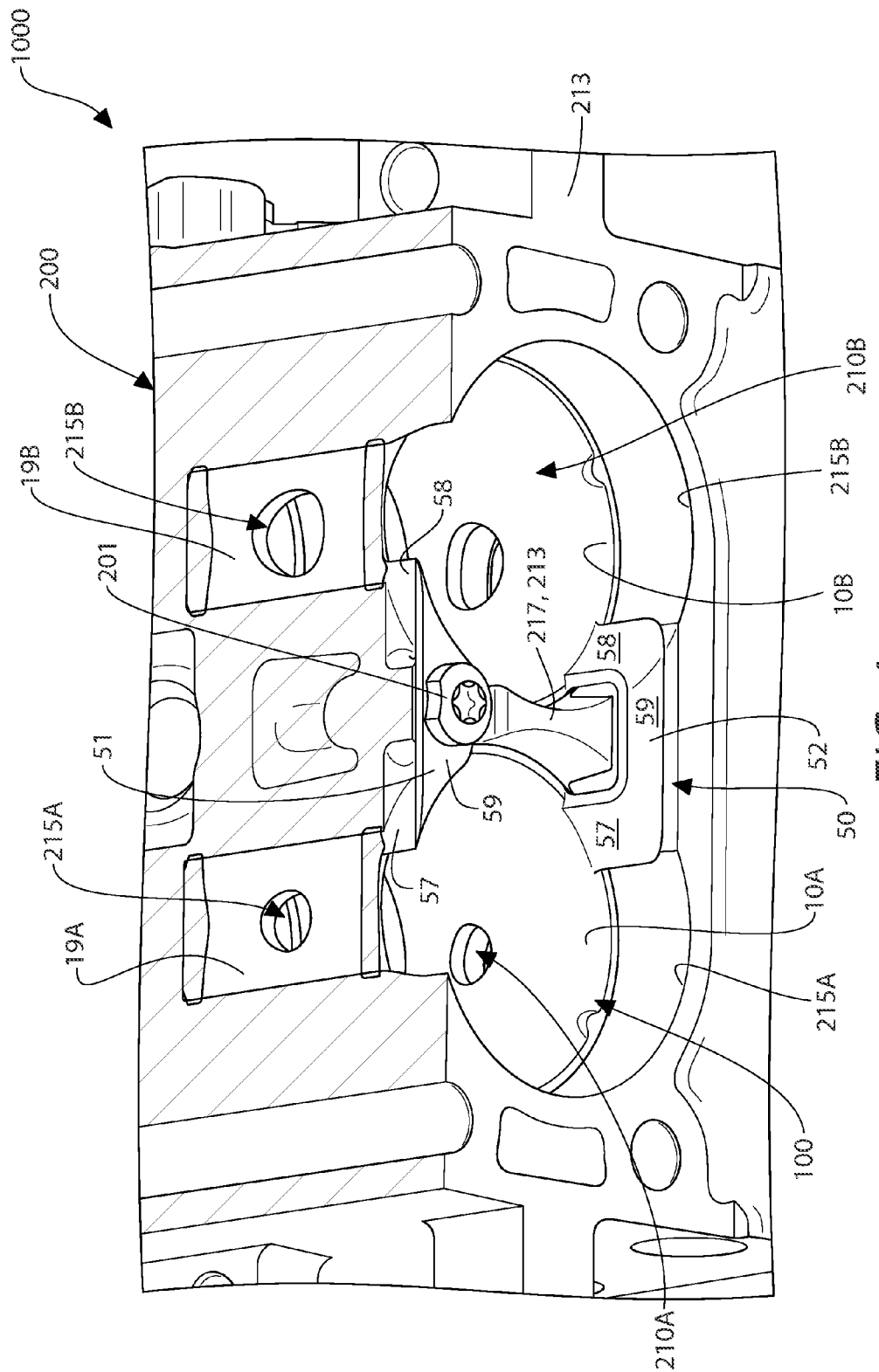
FIG. 4 is perspective view of the carburetor of FIG. 2 wherein an upper portion of the carburetor body has been cut-away to expose upper portions of the venturi tubes of the venturi insert.

Referring now to FIGS. 3 and 6 concurrently, the carburetor body 200 further comprises a fuel header 220 (which is a chamber similar to a fuel bowl in a traditional liquid fuel carburetors). Fuel, such as a gaseous fuel, is supplied to the fuel header via a fuel supply opening 222 to which a first end of a fuel supply conduit 221 is fluidly coupled. The fuel supply conduit 221 is fluidly coupled (at the other end), either directly or indirectly, to a source of gaseous fuel (not shown), such as a propane or natural gas supply tank or reservoir. When the carburetor 1000 is fully assembled, the lower end of the fuel chamber 220 is hermetically sealed using a plate 223 and a suitable gasket (FIG. 5).

The carburetor body 200 further comprises a first fuel delivery passage 225A and a second fuel delivery passage 225B. The first fuel delivery passage 225A forms a passageway from the fuel chamber 220 to the first throttle bore 210A while the second fuel delivery passage 225B forms a passageway from the fuel header 220 to the second throttle bore 210B. The first fuel delivery passage 225A terminates as an opening 226A in the sidewall 211A of the first throttle bore 210A. The second fuel delivery passage 225B terminates as an opening 226B in the sidewall 211B of the second throttle bore 210B.

When the first and second venturi tubes 10A-B are properly positioned within the first and second throttle bores 210A-B respectively, the first and second fuel ports 15A-B of the first and second venturi tubes 10A-B are in fluid communication with the first and second fuel delivery passages 225A-B respectively. As a result, fuel from the fuel chamber 200 can be supplied to each of the first and second venturi passages 11A-B as needed during operation of the internal combustion engine. More specifically, proper positioning of the first and second venturi tubes 10A-B within the first and second throttle bores 210A-B results in the first and second annular groves 222A-B of the first and second venturi tubes being in transverse alignment with the first and second fuel delivery passages 225A-B respectively. As a result, first and second annular fuel chambers 227A-B are formed between the outer surfaces 19A-B of the first and second venturi tubes 10A-B and the sidewalls 211A-B of the first and second throttle bores 210A-B respectively.

Each of the metering apertures 16A of the first fuel port 15A are in fluid communication with the first annular fuel chamber 227A while each of the metering apertures 16B of the second fuel port 15B are in fluid communication with the second annular fuel chamber 227B. As a result, fuel supplied to the first annular chamber 227A by the first fuel delivery passage 225A is introduced into the first venturi passage 11A via both of the metering apertures 16A of the first fuel port 15A at different circumferential positions, thereby improving the homogeneity of the resulting air-fuel mixture that exits the first throttle bore 210A. Similarly, fuel supplied to the second annular chamber 227B by the second fuel delivery passage 225B is introduced into the second venturi passage 11B via both of the metering apertures 16B of the second fuel port 15B at different circumferential positions thereby improving the homogeneity of the resulting air-fuel mixture that exits the second throttle bore 210B.

The first and second flanges 20A, 21A of the first venturi tube 10A form annular seals 212A, 212B with the sidewall 211A of the first throttle bore 210A, thereby sealing the sides of the first annular chamber 227A. As a result, fuel in the first annular chamber 227A is prevented from being introduced into an air stream flowing through the first throttle bore 210A at any other location other than through the first fuel port 15A (which comprises the metering apertures 16A). Similarly, the first and second flanges 20B, 21B of the second venturi tube 10B form annular seals 212C, 212D with the sidewall 211B of the second throttle bore 210B, thereby sealing the sides of the second annular chamber 227B. As a result, fuel in the second annular chamber 227B is prevented from being introduced into an air stream flowing through the second throttle bore 210B at any other location other than through the second fuel port 15B (which comprises the metering apertures 16B).

While the creation of the annular seals 212A-D in the exemplified embodiment is achieved by a press fit a compression fit) between the first and second annular flanges 20A-B, 21A-B of the first and second venturi tubes 10A-B, said annular seals 212A-D can be formed by other means instead of or in addition thereto. For example, an O-ring, gasket, or other sealing element can be used, in the exemplified embodiment, the first and second flanges 20A-B, 21A-B of the first and second venturi tubes 10A-B are integrally formed annular sealing elements.

Referring now to FIGS. 3 and 5-6 concurrently, the carburetor 1000 further comprises a throttle shaft 300 rotatably mounted in the carburetor body 200. A throttle plate 301A-B is located in each of the first and second throttle bores 210A-B respectively and operably coupled to the throttle shaft 300. As is known in the art, the throttle shaft 300 is operably coupled to an actuator, such as an accelerator, that when actuated by the user rotates the throttle shaft 300. As a result of rotating the throttle shaft 300, the throttle plates 301A-B are pivoted, thereby increasing and/or decreasing the cross-sectional area of the first and second throttle bores 210A-B through which the air stream (or stream of air-fuel mixture) can flow. The use of a throttle assembly is well known in the art and requires no further discussion. As can be seen, the first and second venturi tubes 10A-B are respectively located in the first and second throttle bores 210A-B upstream of the throttle plates 301A-B.

Once the venturi insert 100 is mounted, as described above, to the carburetor body 200, the venturi insert 100 is secured to the carburetor body 200 by inserting the bolt 201 through the hole 60 (FIG. 1) of the linking member 50 and threadily coupling the bolt 201 to a threaded hole/bore (not visible) of the carburetor body 200. As a result, it is ensured that the each of the first and second venturi tubes 10A-B are in, and maintained, in proper position/alignment within the first and second throttle bores 210A-B. In alternate embodiments, the design of the linking member 50 can provide features that match corresponding features in the carburetor body 200, further preventing the venturi insert 100 from being installed in the wrong spatial position and/or orientation. The design of the linking member 50 can also include additional means of securing the improved venturi to the carburetor body 200, preventing it from moving axially or rotationally during the life of the carburetor 1000.

In certain embodiments, because the linking member 50 is flexible and resilient, the linking member 50 can bias the outlet edges 13A-B of the first and second venturi tubes 10A-B into abutment with first and second transverse shoulders 218A-B of the first and second throttle bores 210A-B when the linking member 50 is secured to the carburetor body 200. This can be accomplished by designing the venturi insert 100 so that the axial distance between the outlet edges 13A and the contact surface of the linking member 50 is slightly greater than the axial distance between the transverse shoulders 218A-B and the end surface 213 of the divider 217.

Due to the linking member 50 being secured to the carburetor body 200, there is no need for additional pins or dowels within the first and second throttle bores 210A-B to retain the venturi tubes 10A-B in proper position. Thus, in certain embodiments, the invention is free of pins, set screws, or other mechanisms required that retain the venturi tubes 10A-B in proper position within the first and second throttle bores 210A-B, as is the case with traditional carburetors.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the foregoing description and drawings represent the exemplary embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A carburetor for an internal combustion engine comprising:
 a carburetor body comprising a plurality of throttle bores extending through the carburetor body, and for each of the throttle bores a fuel delivery passage terminating at a sidewall of the throttle bore;
 an insert comprising a plurality of venturi tubes and a linking member connecting the venturi tubes together, each of the venturi tubes comprising a venturi passage and a fuel port for introducing fuel into the venturi passage; and
 the insert secured to the carburetor body so that the venturi tubes extend into the throttle bores and the fuel ports are in fluid communication with the fuel delivery passages, and the linking member is in contact with the carburetor body.

2. The carburetor according to claim 1 wherein the insert is an integrally formed single component.

3. The carburetor according to claim 2 wherein the carburetor body is formed of a material having a first Young's modulus and the insert is formed of a material having a second Young's modulus that is less than the first Young's modulus.

4. The carburetor according to claim 1 wherein the linking member is flexible and resilient.

5. The carburetor according to claim 1 wherein the linking member comprises a first strap having a first end connected to an inlet edge of a first one of the venturi tubes and a second end connected to an inlet edge of a second one of the venturi tubes; and wherein the linking member further comprises a second strap having a first end connected to the inlet edge of the first one of the venturi tubes and a second end connected to the inlet edge of the second one of the venturi tubes, the first and second straps spaced apart from one another.

6. The carburetor according to claim 1 wherein the linking member comprises first and second axial sections and a transverse section connecting the first and second axial sections, the first axial section connected to a first one of the venturi tubes and the second axial section connected to a second one of the venturi tubes.

7. The carburetor according to claim 6 wherein the first axial section extends into a first one of the throttle bores and the second axial section extends into a second one of the throttle bores, the transverse section in contact with an end surface of the carburetor body.

8. The carburetor according to claim 1 further comprising:
the venturi tubes comprising a first venturi tube and a second venturi tube;
the venturi passage of the first venturi tube extending along a first venturi axis and the venturi passage of the second venturi tube extending along a second venturi axis;
the first venturi tube comprising an inlet edge that circumscribes the first venturi axis at a first radius, the first venturi axis intersecting a first plane formed by the inlet edge of the first venturi tube at a first point;
the second venturi tube comprising an inlet edge that circumscribes the second venturi axis at a second radius, the first venturi axis intersecting a second plane formed by the inlet edge of the second venturi tube at a second point; and
the first and second points being separated by a distance that is greater than the sum of the first and second radii.

9. The carburetor according to claim 1 wherein each of the venturi tubes comprises a first annular flange and a second annular flange, the first and second annular flanges of the venturi tubes forming hermetic seals with the sidewalls of the throttle bores; wherein each of the venturi tubes comprises an annular groove formed between the first and second annular flanges, the fuel port extending from the annular groove to the venturi passage, and wherein the annular grooves are in fluid communication with the fuel delivery passages; and wherein for each of the venturi tubes, the first annular flange comprises an inlet edge of the venturi tube and the second annular flange comprises an outlet edge of the venturi tube.

10. The carburetor according to claim 1 wherein the fuel port of a first one of the venturi tubes has a first effective cross-sectional area and the fuel port of a second one of the venturi tubes has a second effective cross-sectional area that is different than the first effective cross-sectional area.

11. The carburetor according to claim 1 wherein for each of the throttle bores, the sidewall comprises a transverse shoulder extending into the throttle bore, and wherein the linking member is secured to an end surface of the carburetor body so that outlet edges of the venturi tubes are in abutment with the transverse shoulders; and wherein the linking member is flexible and resilient, the linking member biasing outlet edges of the venturi tubes into abutment with the transverse shoulders of the throttle bores when the linking member is secured to the carburetor body.

12. A system for mixing air and a gaseous fuel for an internal combustion engine comprising:
a carburetor comprising:
a carburetor body comprising a plurality of throttle bores extending through the carburetor body, and for each of the throttle bores a fuel delivery passage terminating at a sidewall of the throttle bore;
an insert comprising a plurality of venturi tubes and a linking member connecting the venturi tubes together, each of the venturi tubes comprising a venturi passage and a fuel port for introducing fuel into the venturi passage; and
the insert secured to the carburetor body so that the venturi tubes extend into the throttle bores and the fuel ports are in fluid communication with the fuel delivery passages, and the linking member is in contact with the carburetor body; and
a source of gaseous fuel fluidly coupled to the fuel delivery passages of the carburetor.

13. The system according to claim 12 wherein the carburetor further comprises a throttle plate in each of the throttle bores, each of the venturi tubes extending from an inlet edge to an outlet edge, the venturi tubes located in the throttle bores so that the outlet edges of the venturi tubes are disposed inside of the throttle bores and upstream of the throttle plates.

14. The system according to claim 12 wherein the insert is an integrally formed single component; and wherein the carburetor body is formed of a material having a first Young's modulus and the insert is formed of a material having a second Young's modulus that is less than the first Young's modulus.

15. An insert for a carburetor body comprising:
a first venturi tube comprising an outer surface and an inner surface forming a first venturi passage, the first venturi tube comprising a first fuel port extending from the outer surface of the first venturi tube to the inner surface of the first venturi tube;
a second venturi tube comprising an outer surface and an inner surface forming a second vermin passage, the second venturi tube comprising a second fuel port extending from the outer surface of the second venturi tube to the inner surface of the second venturi tube; and
a linking member having a first end connected to the first vermin tube and a second end connected to the second venturi tube, the linking member being flexible and resilient.

16. The insert according to claim 15 wherein the insert is art integrally formed single component.

17. The insert according to claim 15 wherein the first venturi passage extends along a first venturi axis and the second venturi axis extends along a second venturi passage, and wherein the linking member biases the first and second venturi tubes into an orientation in which the first and second venturi axes are substantially non-parallel.

18. The insert according to claim 15 wherein the linking member comprises a first strap having a first end connected to an inlet edge of the first venturi tube and a second end connected to an inlet edge of the second venturi tube; wherein the first strap comprises means for securing the insert to the carburetor body; and wherein the linking member further comprises a second strap having a first end connected to the inlet edge of the first one of the venturi tubes and a second end connected to the inlet edge of the second one of the venturi tubes, the first and second straps spaced apart from one another.

19. The insert according to claim 15 wherein the linking member comprises first and second axial sections and a transverse section connecting the first and second axial sections, the first axial section connected to a first one of the venturi tubes and the second axial section connected to a second one of the venturi tubes; and wherein the first and second axial section extend substantially perpendicular from the transverse section.

20. The insert according to claim 15 wherein each of the first and second venturi passages comprises an inlet section, an outlet section, and a throat section located between the inlet and outlet sections, wherein the inlet section has a transverse cross-sectional area that decreases in size moving toward the throat section and the outlet section has a transverse cross-sectional area that increase in size moving away from the throat section; and wherein the first fuel port of the first venturi tube has a first effective cross-sectional area and the second fuel port of the second venturi tube has a second effective cross-sectional area that is different than the first effective cross-sectional area.

* * * * *